(12) United States Patent
West

(10) Patent No.: US 8,667,802 B2
(45) Date of Patent: Mar. 11, 2014

(54) VARIABLE FAN DUCT NOZZLE TRANSLATABLE CORE/INNER COWL INCLUDING TWO OVERLAPPING PORTIONS MADE OF DIFFERENT MATERIALS

(75) Inventor: Randall Ray West, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 979 days.

(21) Appl. No.: 12/774,816

(22) Filed: May 6, 2010

(65) Prior Publication Data

US 2011/0271685 A1 Nov. 10, 2011

(51) Int. Cl.
*F02K 1/00* (2006.01)
*F02K 1/08* (2006.01)
*F02K 1/06* (2006.01)

(52) U.S. Cl.
CPC .... *F02K 1/08* (2013.01); *F02K 1/06* (2013.01)
USPC .............................. 60/771; 60/226.2; 60/770

(58) Field of Classification Search
CPC ............... F02K 1/08; F02K 1/06; F02K 1/09
USPC .......... 60/226.3, 226.2, 226.1, 262, 231, 770, 60/771; 239/265.19, 265.17
See application file for complete search history.

(56) References Cited

U.S. PATENT DOCUMENTS

| | | | | |
|---|---|---|---|---|
| 3,237,864 A * | 3/1966 | Rabone et al. | ............. | 239/127.3 |
| 3,897,001 A * | 7/1975 | Helmintoller et al. | ........ | 60/226.2 |
| 4,527,388 A * | 7/1985 | Wallace, Jr. | ..................... | 60/204 |
| 7,178,338 B2 * | 2/2007 | Whurr | .............. | 60/771 |
| 7,673,458 B2 * | 3/2010 | Kemper et al. | ................. | 60/770 |
| 7,681,399 B2 * | 3/2010 | Orlando et al. | ................. | 60/770 |
| 7,726,116 B2 * | 6/2010 | Kemper et al. | ............. | 60/226.3 |
| 8,091,334 B2 * | 1/2012 | Moniz et al. | .................... | 60/204 |
| 8,272,204 B2 * | 9/2012 | Migliaro, Jr. | ................ | 60/226.3 |
| 8,434,309 B2 * | 5/2013 | Levasseur | ....................... | 60/771 |
| 8,443,586 B2 * | 5/2013 | Schwark et al. | ............. | 60/226.3 |
| 8,511,973 B2 * | 8/2013 | Ramlaoui et al. | ............. | 415/144 |
| 2008/0271431 A1 * | 11/2008 | Porte | ........................... | 60/226.1 |
| 2009/0053058 A1 * | 2/2009 | Kohlenberg et al. | .......... | 415/227 |
| 2009/0208328 A1 * | 8/2009 | Stern | ............................ | 415/145 |
| 2009/0320488 A1 * | 12/2009 | Gilson et al. | .................... | 60/771 |
| 2010/0095650 A1 * | 4/2010 | Schafer | ........................ | 60/226.3 |
| 2011/0120079 A1 * | 5/2011 | Schwark et al. | ............. | 60/226.2 |
| 2011/0167790 A1 * | 7/2011 | Cloft et al. | .................... | 60/226.2 |
| 2011/0302907 A1 * | 12/2011 | Murphy | ....................... | 60/226.3 |
| 2012/0011825 A1 * | 1/2012 | Hall et al. | ....................... | 60/204 |
| 2012/0023901 A1 * | 2/2012 | Gilson et al. | ................ | 60/226.3 |
| 2012/0109593 A1 * | 5/2012 | Hall et al. | ......................... | 703/1 |

* cited by examiner

*Primary Examiner* — William H Rodriguez
(74) *Attorney, Agent, or Firm* — Hovey Williams LLP

(57) ABSTRACT

An aircraft nacelle comprising an outer cowl and an inner cowl located inward of the outer cowl with an air flow path formed therebetween. The inner cowl may comprise a forward portion and an aft portion slidable in a forward-to-aft direction via one or more actuators. When translated aftward, the aft portion may decrease the area of the nacelle's fan duct nozzle. The greatest radial distance between the inner cowl and a center axis of the nacelle may occur at or forward of a location in which the forward and aft portions overlap each other. The forward portion may be comprised of a different material than the aft portion.

20 Claims, 13 Drawing Sheets

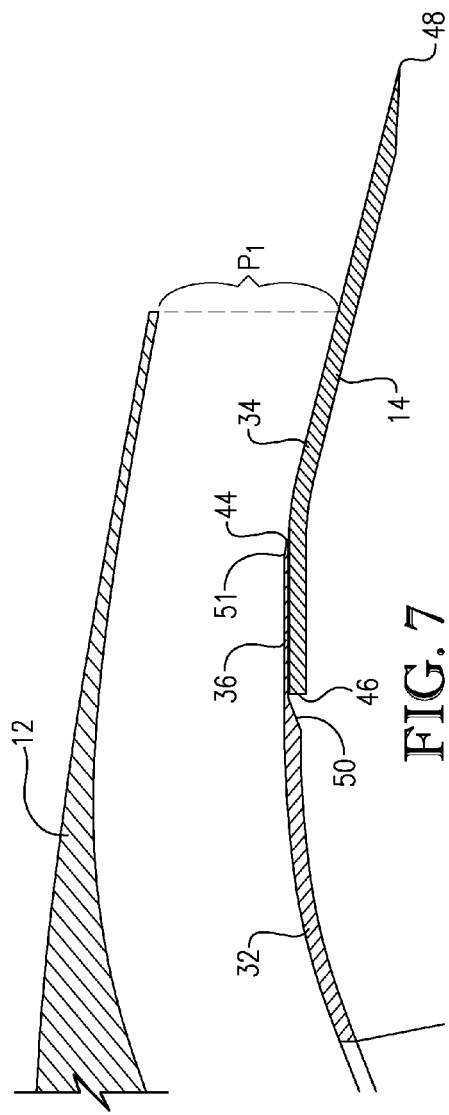
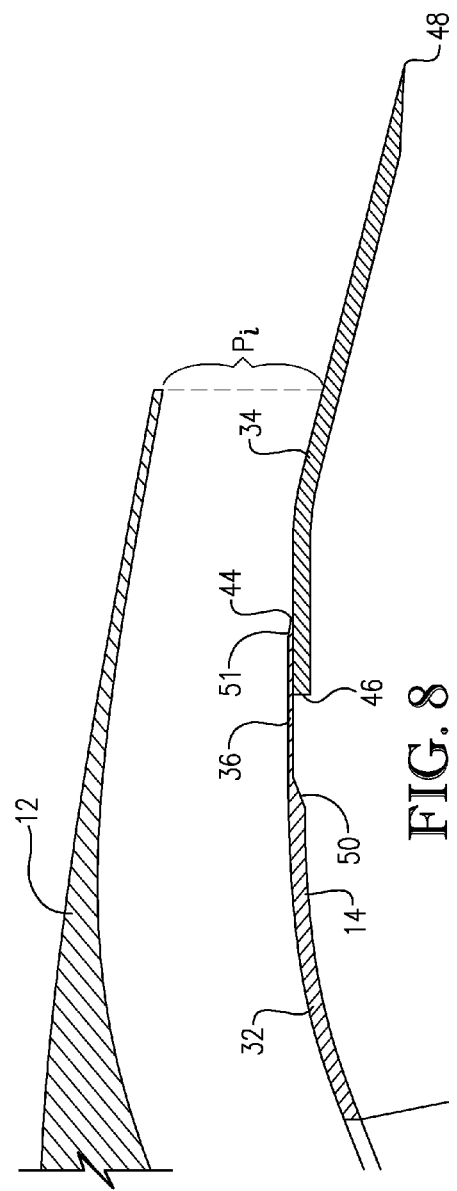

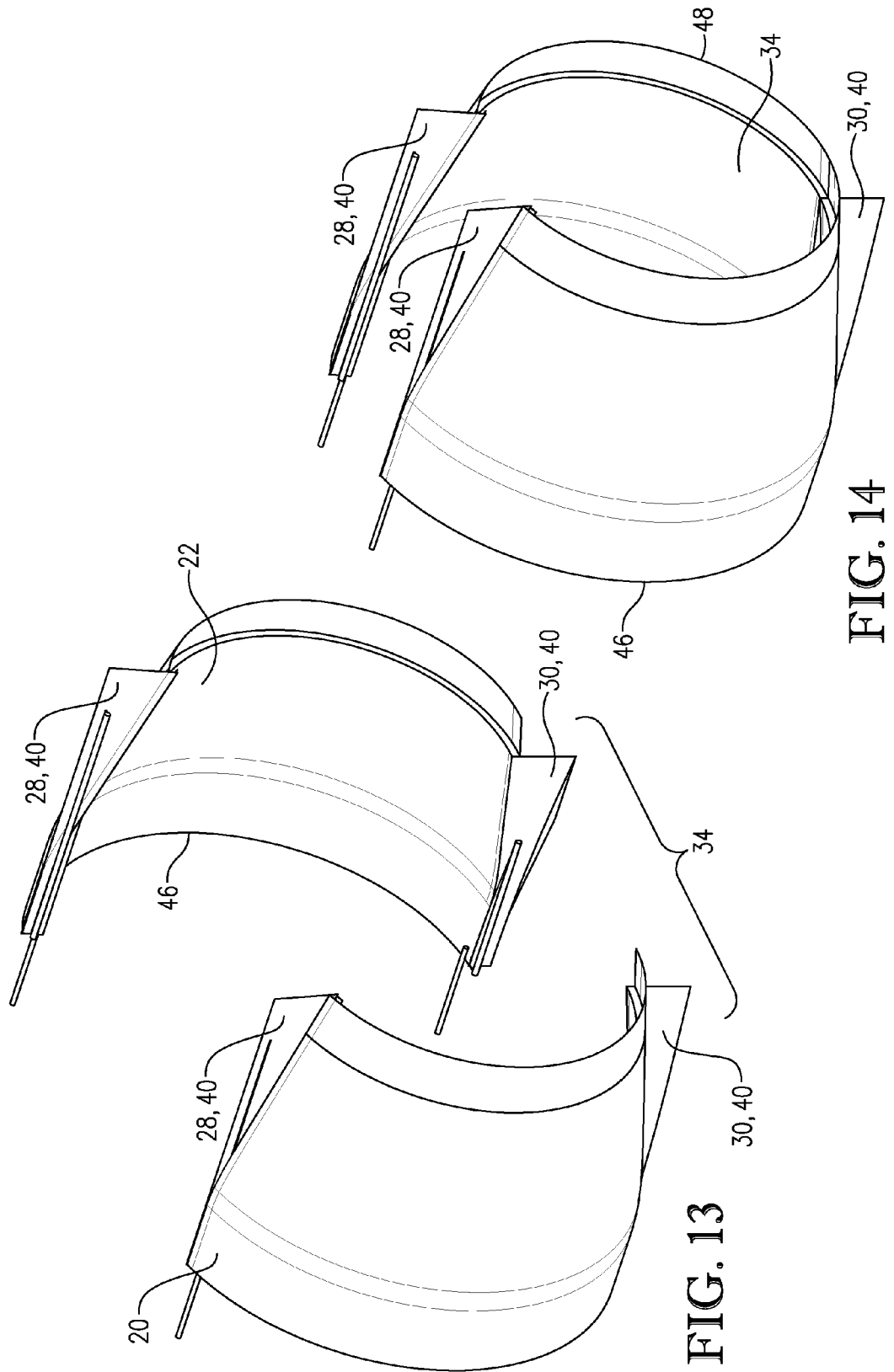

VARIABLE FAN DUCT NOZZLE TRANSLATABLE CORE/INNER COWL INCLUDING TWO OVERLAPPING PORTIONS MADE OF DIFFERENT MATERIALS

BACKGROUND

1. Field

Embodiments of the present invention relate to aircraft nacelles and fan duct nozzles.

2. Related Art

An aircraft nacelle is a structure that surrounds an aircraft engine and broadly includes an inner cowl surrounding the engine and an outer cowl positioned outward of the inner cowl, forming an air duct or fan duct therebetween. Air flows in a forward to aft direction through the fan duct and out through an opening at an aft end of the nacelle, sometimes referred to as a nozzle.

In some applications, it is desired to vary the area of the nozzle. For example, by increasing the area of the nozzle during aircraft take-off, a fan within the nacelle is allowed to operate at a lower fan pressure ratio (FPR). This can increase the aircraft's engine efficiency, leading to reduced noise. Lowering the FPR enhances the fan stability and reduces its potential to stall. The nozzle area can be decreased as air temperature and density decrease at higher altitudes to gain added performance. At a cruising altitude, the nozzle area can be adjusted to compliment the engine cycle which has been optimized for cruise.

Moving and sliding components can be used to vary the nozzle area. Some prior art nacelles manipulate an outer flow surface of the fan duct (i.e., the outer cowl or translating sleeve of a thrust reverser) to vary the nozzle area. However, manipulating the outer flow surface can be complicated, particularly if the nacelle comprises a translating sleeve thrust reverser with its own actuators and moving parts.

Other prior art methods of varying nozzle area involve manipulating inner flow surfaces of the fan duct. Because it is generally desired to limit the size or volume of the nacelle at its aft end, prior art activation mechanisms for manipulating movable inner flow surfaces are usually positioned well forward of trailing edges of the air duct exit. Thus, the movable inner surfaces are designed with a large length to create the desired distance between the trailing edge and the activation mechanisms. However, this also increases the possibility of fan duct leakage at joints of the movable inner surface, negatively affecting the performance of the nozzle. Moreover, these movable inner surfaces can be heavy and require robust activation or manipulation components, which add even more undesired weight to the nacelle.

Some manipulated inner flow surfaces reduce the fan duct's area more at a location forward of the fan duct's exit than at the fan duct's exit, decreasing air flow efficiency. Furthermore, the location, size, and number of seams or joints of a variable nozzle can create undesired air leakage paths, causing premature wear on various components.

Accordingly, there is a need for an improved nacelle and variable fan duct nozzle that overcomes the limitations of the prior art.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

Embodiments of the present invention solve the above-mentioned problems and provide a distinct advance in the art of variable nozzles for nacelles. More particularly, embodiments of the invention provide an inner cowl having a translatable aft portion operable to increase and decrease nozzle area at an exit of the nacelle's fan duct.

An aircraft nacelle constructed in accordance with an embodiment of the present invention comprises an outer cowl and an inner cowl located inward of the outer cowl with an air flow path formed therebetween. The nacelle may substantially surround an aircraft engine about an imaginary center axis. The inner cowl may comprise a forward portion and an aft portion slidable in a forward-to-aft direction via one or more actuators of the nacelle. When translated aftward, the aft portion may decrease the opening size of the fan duct's nozzle or exit opening.

The forward portion may have a first front edge and a first aft edge. A radial distance between the first front edge and the center axis of the nacelle may be smaller than a radial distance between the first aft edge and the center axis. The aft portion may have a second front edge and a second aft edge. A radial distance between the second front edge and the center axis of the nacelle may be larger than a radial distance between the second aft edge and the center axis. A largest radial distance between the inner cowl and the center axis of the nacelle may occur at or forward of a location in which the forward portion and the aft portion overlap. In some embodiments of the invention, the forward portion may be comprised of a different material than the aft portion.

In operation, the aft portion may be translated in a forward-to-aft direction away from the forward portion of the inner cowl from a first position to a second position. Moving the aft portion from the first position to the second position may decrease an aft exit area for the air flowing between the outer cowl and inner cowl.

BRIEF DESCRIPTION OF THE DRAWING FIGURES

A preferred embodiment of the present invention is described in detail below with reference to the attached drawing figures, wherein:

FIG. 7 is a fragmentary cross-sectional view of the nacelle of FIG. 1, with an aft portion of an inner cowl thereof located at a first position;

FIG. 8 is a fragmentary cross-sectional view of the nacelle of FIG. 1, with the aft portion of the inner cowl thereof located at an intermediate position;

FIG. 13 is an exploded perspective view of an aft portion of the nacelle of FIG. 12, including two halves mechanically attachable with each other;

FIG. 14 is a perspective view of an alternative embodiment of the aft portion of the nacelle of FIG. 12 constructed as a single, integrally-formed 350-degree duct.

Figure 1:
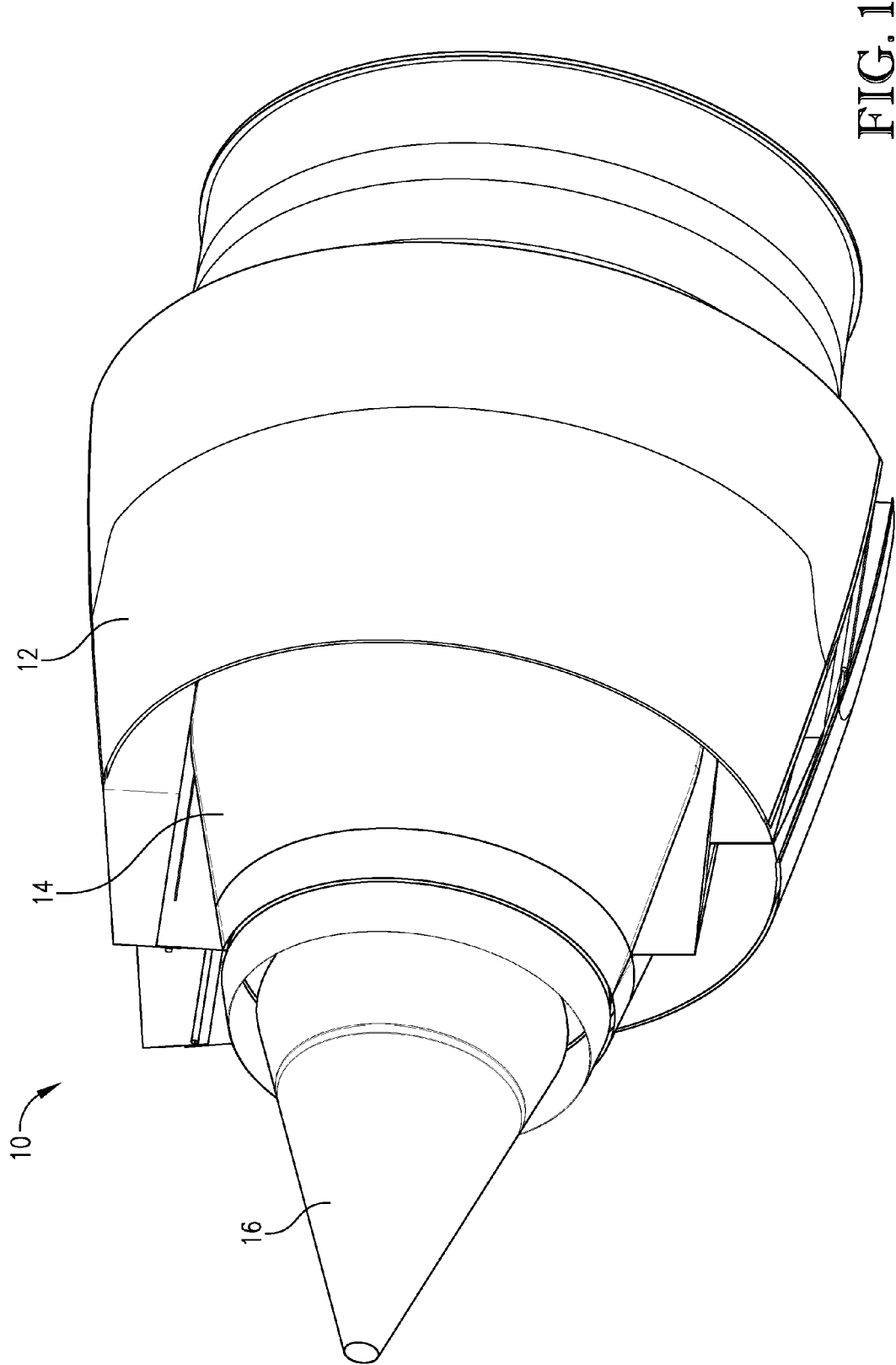
FIG. 1 is a perspective view of a nacelle constructed in accordance with an embodiment of the present invention

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
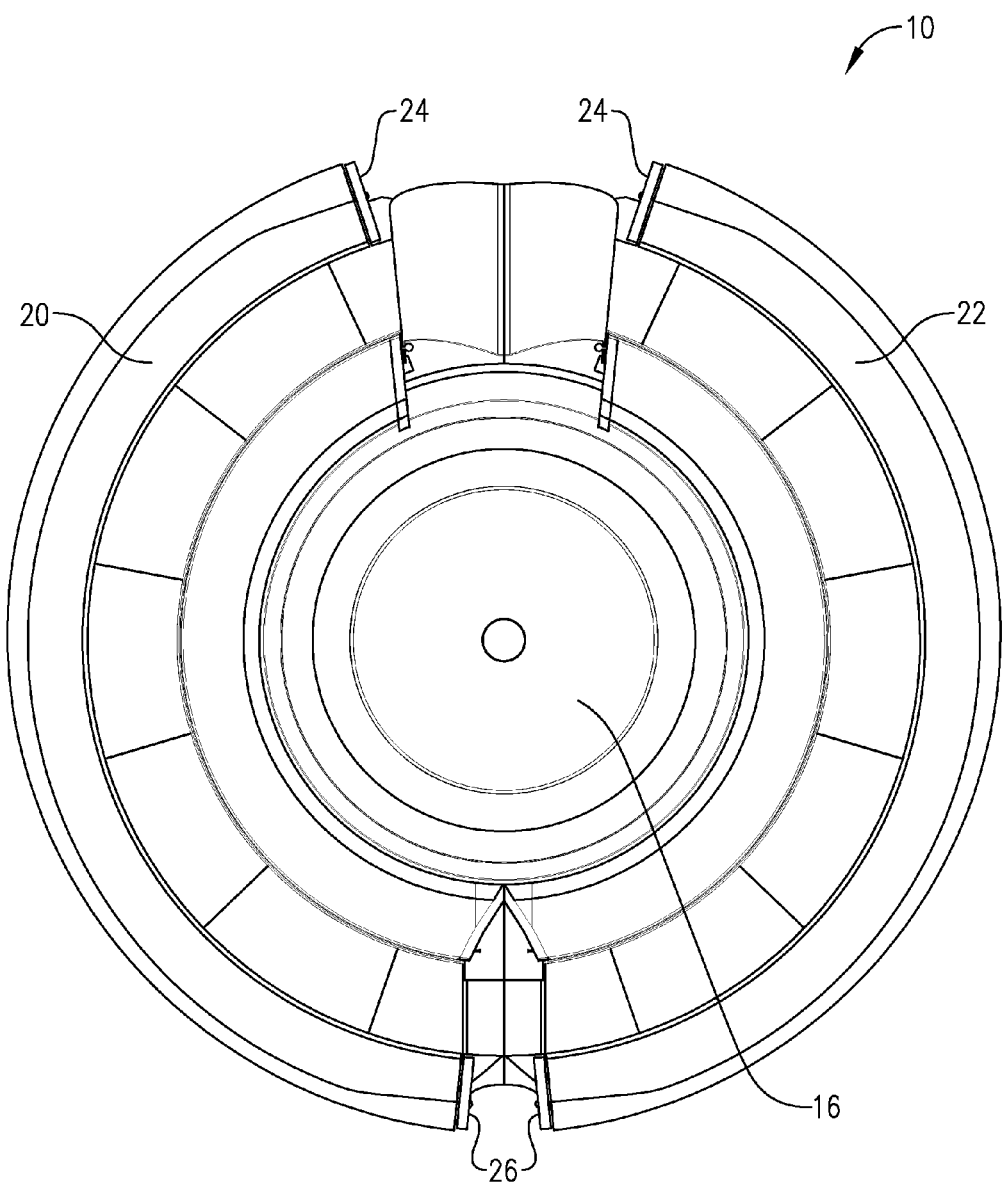
FIG. 2 is an elevational view of an aft end of the nacelle of FIG. 1.
Figure 3:
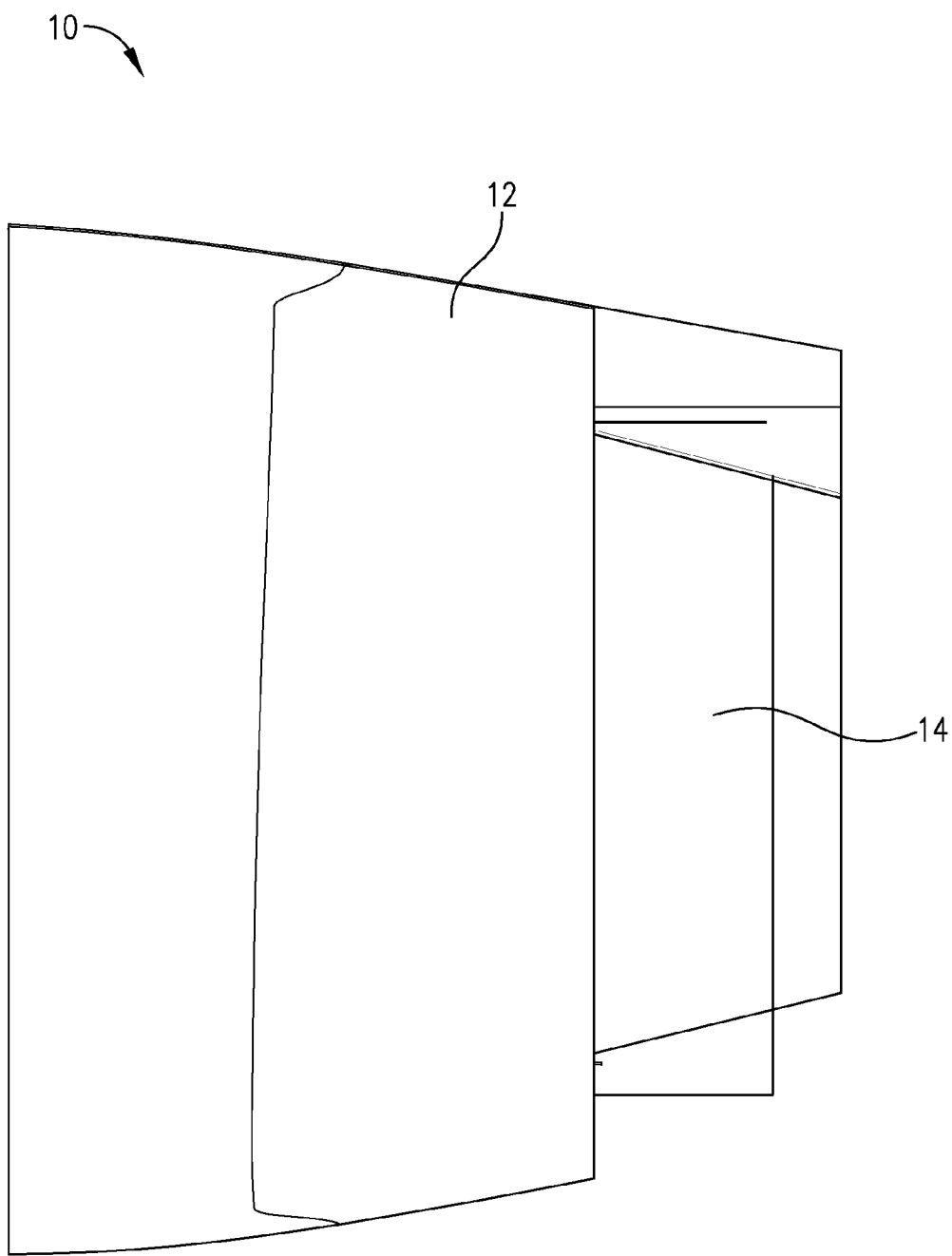
FIG. 3 is an elevational side view of the nacelle of FIG. 1.

Embodiments of the present invention are illustrated in FIG. 1 and include an aircraft nacelle 10 comprising an outer cowl 12 and an inner cowl 14 positioned inward of the outer cowl 12. The inner cowl 14 may substantially surround an engine 16 of an aircraft about an imaginary center axis (not shown). The nacelle 10 may be a single structure or may comprise two or more sections that are joined together. For example, the nacelle 10 may have a first nacelle half 20 and a second nacelle half 22, as illustrated in FIG. 2. Some embodiments of the nacelle extend approximately 350 degrees around the engine; however, the nacelle 10 may extend more or less than 350 degrees around the engine 16 without departing from the scope of the present invention.

Each of the nacelle halves 20,22 may comprise half of the outer cowl 12 and half of the inner cowl 14, as illustrated in FIGS. 3-6. Each nacelle half 20,22 may have a top edge 24 and a bottom edge 26. The top edges 24 of the nacelle halves 20,22 may be fixedly, slidably, and/or pivotally attached to opposite sides of an aircraft pylon (not shown) extending from an aircraft wing. Furthermore, the bottom edges 26 of the nacelle halves 20,22 may be fixedly and/or detachably attached with each other, thereby forming a substantially continuous casing around the engine 16 of the aircraft.

Figure 4:
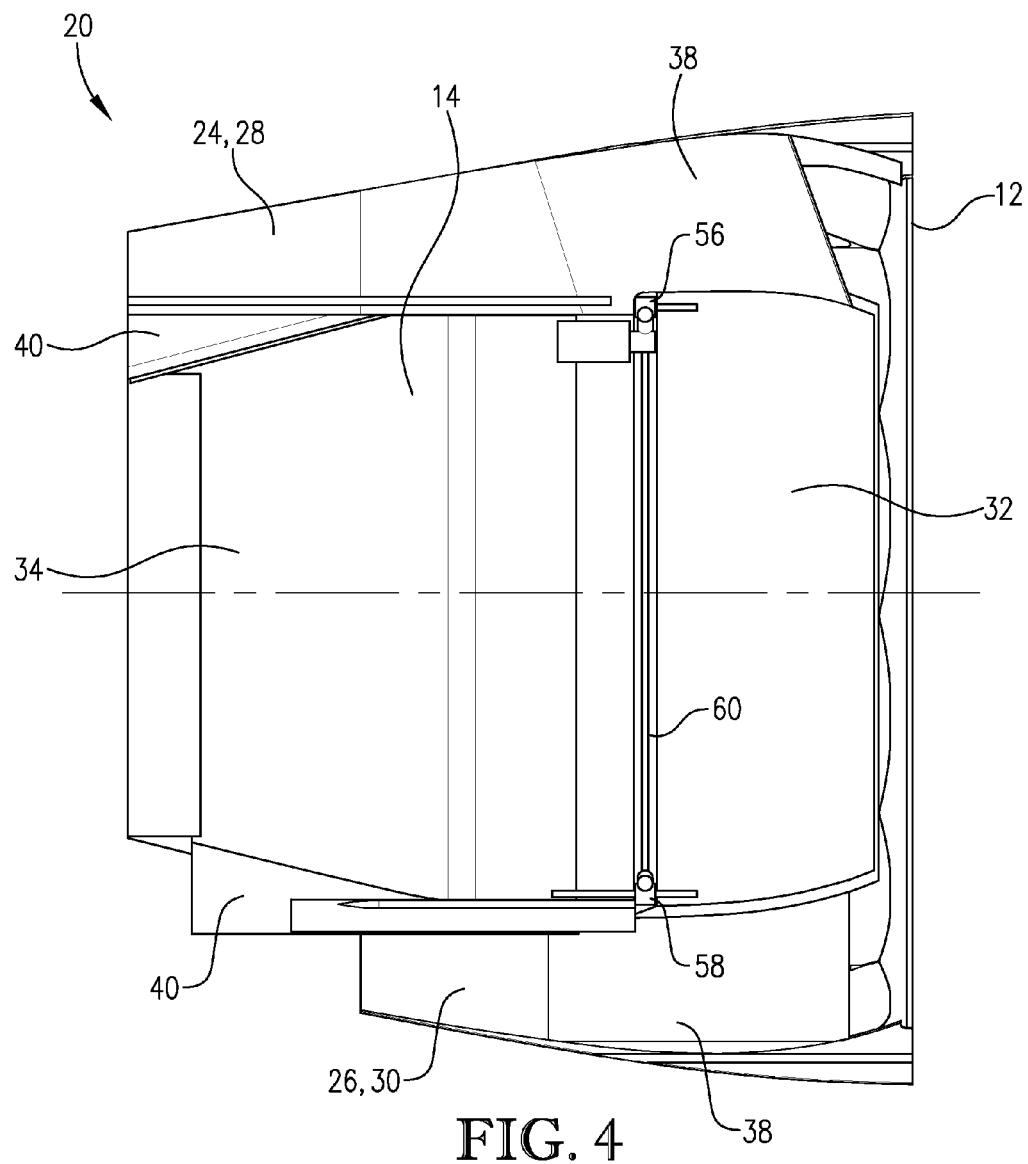
FIG. 4 is a vertical sectional view of an inner side of a half of the nacelle of FIG. 1.

As illustrated in FIG. 4, the top edge 24 may comprise an upper support structure 28 extending from a top edge of the inner cowl 14 to a top edge of the outer cowl 12. The bottom edge 26 may comprise a lower support structure 30 extending from a bottom edge of the inner cowl 14 to a bottom edge of the outer cowl 12. In some embodiments of the invention, the nacelle 10 is not divided into halves, but rather forms a substantially continuous duct with two top edges 24 for attaching the nacelle 10 to the pylon, but no bottom edges. In this embodiment, the lower support structure 30 may be positioned inward of the outer cowl 12 to provide fixed and/or translatable attachment between the inner cowl 14 and the outer cowl 12, as later described herein.

The outer cowl 12 may have a forward end, an aft end, an outer wall, and an inner wall. The outer cowl 12 may attach to a lip (not shown) extending from the outer wall to the inner wall at the forward end of the outer cowl 12. In some embodiments of the invention, a thrust reverser and/or thrust reverser components (not shown) may be housed between the outer wall and the inner wall. Furthermore, the outer wall and the inner wall may converge at the aft end of the outer cowl 12. In alternative embodiments of the invention, the outer cowl 12 does not comprise or house a thrust reverser therein.

The inner cowl 14 located inward of the outer cowl 12 may form an air flow path allowing air to flow in a forward-to-aft direction therebetween. The space between the inner cowl 14 and the outer cowl 12 may be referred to herein as a fan duct. As illustrated in FIGS. 12 and 4-6, the inner cowl 14 may comprise a forward portion 32, an aft portion 34, and one or more actuators 56,58. In some embodiments of the invention, the forward portion 32 may be made of a different material than the aft portion 34. For example, the forward portion 32 may be made of a material less resistant to heat than the material used for the aft portion 34.

Figure 6:
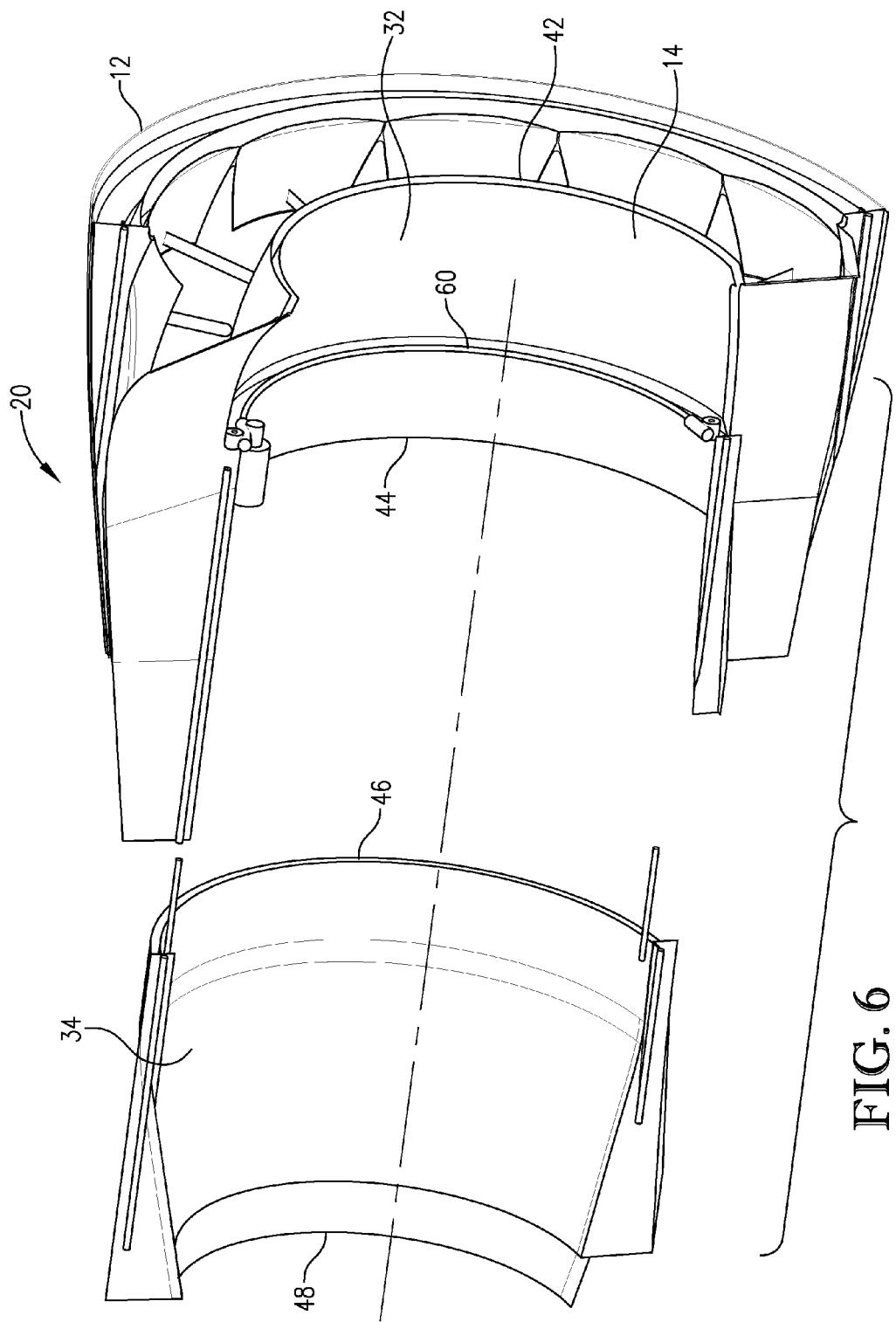
FIG. 6 is an exploded perspective view of the half of the nacelle of FIG. 4.

As illustrated in FIG. 6, the forward portion 32 may have a first front edge 42 and a first aft edge 44. In some embodiments of the invention, the first front edge 42 may be a smaller radial distance away from the center axis of the nacelle 10 and/or inner cowl 14 than a radial distance between the first aft edge 44 and the center axis of the nacelle 10 and/or inner cowl 14.

The aft portion 34 may have a second front edge 46 and a second aft edge 48. In some embodiments of the invention, the second front edge 46 may be a larger radial distance away from the center axis of the nacelle 10 and/or inner cowl 14 than a radial distance between the second aft edge 48 and the center axis of the nacelle 10 and/or inner cowl 14. A largest radial distance between the inner cowl 14 and the center axis of the nacelle 10 may occur at or forward of a location in which the forward portion 32 and the aft portion 34 meet or overlap. As illustrated in FIG. 13, the aft portion 34 may have two halves. Alternatively, as illustrated in FIG. 14, the aft portion 34 may be substantially continuous, as described herein.

Figure 9:
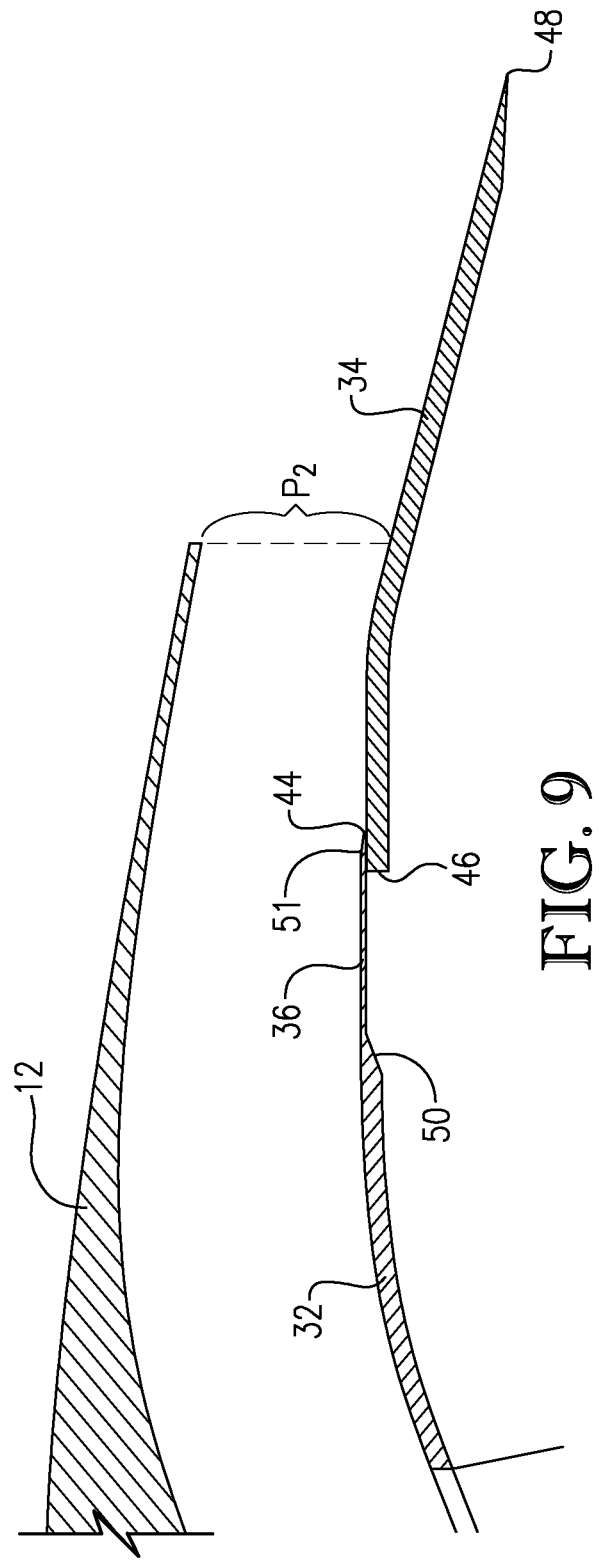
FIG. 9 is a fragmentary cross-sectional view of the nacelle of FIG. 1, with the aft portion of the inner cowl thereof located at a second position.
Figure 10:
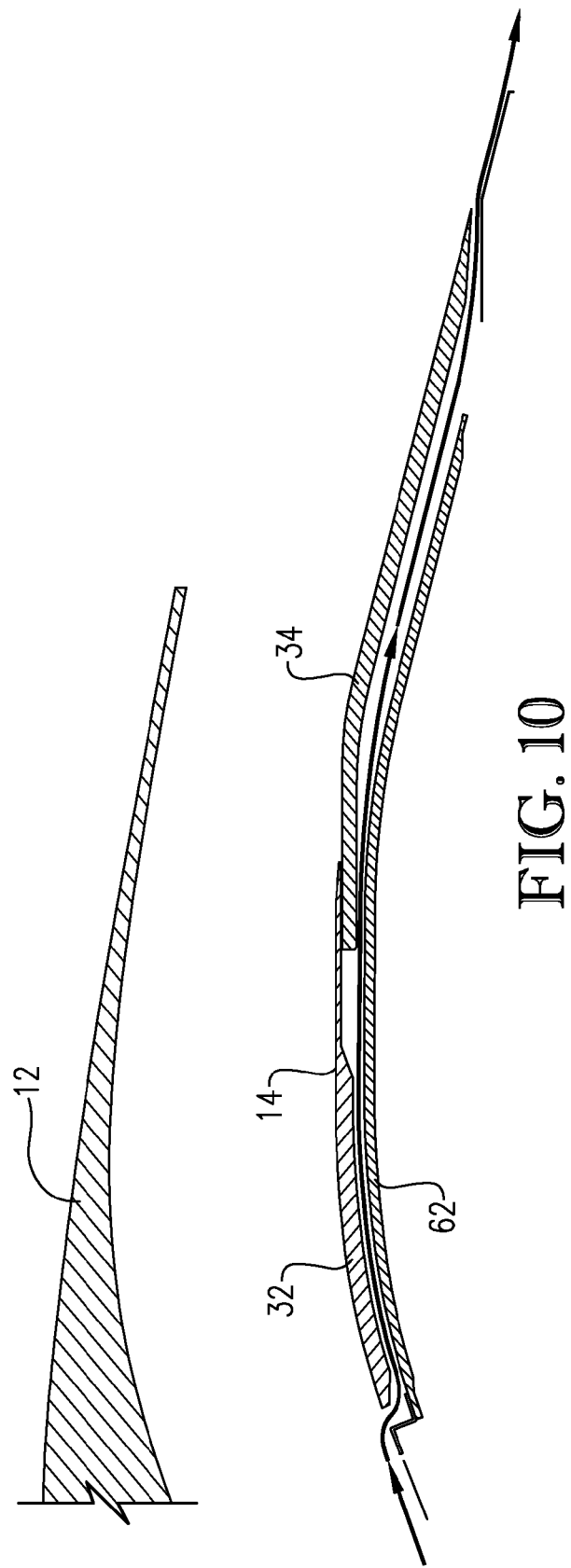
FIG. 10 is a fragmentary cross-sectional view of the nacelle of FIG. 1, further comprising a heat resistant panel positioned a space away from the inner cowl to allow cool air to flow therebetween.

Note in FIGS. 7-9 that the inner wall of the outer cowl 12 is curved in such a way that its radial distance from the center axis increases and then decreases from its forward end to its aft end. The inner cowl 14 is also curved in a similar manner, such that its radial distance from the center axis increases and then decreases from its forward end (first front edge 42) to its aft end (second aft edge 48). The first aft edge 44 or a seam formed between the forward portion 32 and the aft portion 34 of the inner cowl 14 may be located at or aft of an apex of the curved inner cowl 14. The apex of the curved inner cowl 14 may be a location at which the inner cowl 14 is at its greatest radial distance from the center axis.

The second front edge 46 may meet or be substantially overlapped by at least part of the forward portion 32 proximate the first aft edge 44. Specifically, the forward portion 32 may comprise a thickness transition portion 50 proximate the first aft edge 44. The thickness transition portion 50 may be chamfered, beveled, and/or stepped from a first thickness down to a second thickness that is smaller than the first thickness. A thin section 36 of the forward portion 32 having the second thickness may overlap at least part of the aft portion 34 located proximate the second front edge 46. Specifically, the thin section 36 may be located outward of at least part of the aft portion 34. The thin section 36 and thickness transition portion 50 allow for overlap of the forward and aft portions 32,34 while limiting the thickness of the inner cowl 14. In some embodiments of the invention, the thin section 36 may have a thickness identical to the first thickness and the thickness transition portion 50 may be omitted. In either embodiment, the thin section 36, as referenced herein, generally refers to a part of the forward portion 32 configured to overlap the aft portion 34.

Furthermore, a surface of the forward portion 32 facing the outer cowl 12 may have a chamfered portion 51 located at or proximate the first aft edge 44, configured to lessen flow separation effects of a step existing between the forward and aft portions 32,34 produced by the thickness of the forward thin section 36. Alternatively, the aft portion 34 may overlap the forward portion 32, with the aft portion 34 comprising a chamfered portion at or proximate the second front edge 46. However, this alternative embodiment may be more susceptible to drag, since the air flow from forward to aft would directly impact the second front edge 46.

Throughout the length of the thin section 36 and a corresponding part of the aft portion 34 that it overlaps, the forward and aft portions 32,34 may maintain a substantially continuous radial distance away from the center axis. This allows the thin section 36 and the aft portion 34 to lie substantially flush against each other or parallel with each other throughout forward-to-aft translation between the two components.

Figure 5:
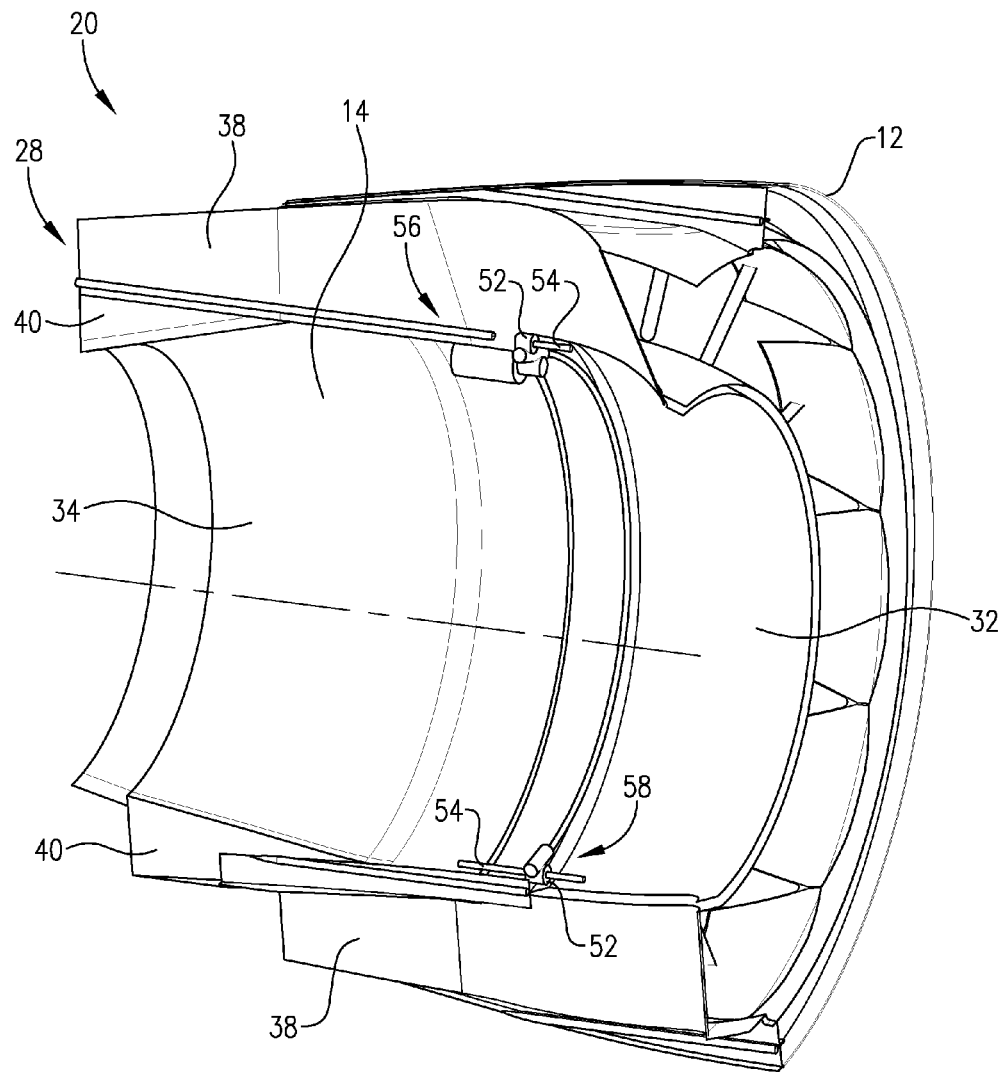
FIG. 5 is a perspective view of the inner side of the half of the nacelle of FIG. 4.

As illustrated in FIG. 5, the support structures 28,30 described above may have a first portion 38 fixed to the forward portion 32 and a second portion 40 fixed to the aft portion 34, and may be configured to translate or slide relative to each other via the one or more actuators 56,58, as later described herein. For example, the first portion 38 may comprise a track and the second portion 40 may comprise one or more slider fittings configured to slidably engage the tracks of the first portion.

The actuators 56,58 may each be configured to translate the aft portion 34 in a forward-to-aft direction. For example, at least one of the actuators 56,58 may comprise a screw-jack mechanism, which is advantageously resistant to uncommanded movement. Specifically, the actuators 56,58 may each comprise a first element 52 fixed relative to the forward portion 32 and a second element 54 fixed relative to the aft portion 34. The first and second elements 52,54 of the actuators 56,58 may slide or be translatable relative to each other and may actuate the second portion 40 of the upper or lower support structure 28,30 to slide in a forward-to-aft direction relative to the first portion 38 of the upper or lower support structure 28,30. For example, actuator drive shafts may be connected to the forward or aft portions 32,34 of the inner cowl 14.

In embodiments of the invention in which the nacelle 10 has two halves, each half 20,22 may comprise at least one top edge actuator 56 and at least one bottom edge actuator 58, as illustrated in FIG. 4. The top edge actuator 56 may be located proximate the top edge 24, the first aft edge 44, and the second forward edge 46. The bottom edge actuator 58 may be located proximate the bottom edge 26, the first aft edge 44, and the second forward edge 46. The top edge actuator 56 and the bottom edge actuator 58 may each comprise the first element 52 and the second element 54. In embodiments of the invention where the nacelle 10 is formed as a substantially continuous fan duct, the nacelle 10 may comprise one bottom edge actuator 58 and two top edge actuators 56.

Furthermore, the actuators 56,58 may operate in cooperation with each other and may be mechanically, electrically, and/or communicatively connected with each other, such as via conduit 60 or drive cable, as illustrated in FIG. 4. For example, the top edge actuator 56 may be a driver actuator, and the bottom edge actuator 58 may be a slave actuator. In some embodiments of the invention, a clutch at the top edge actuator 56 (or driver) may engage the top edge actuator 56 based on the position or movement at the bottom edge actuator 58 (slave) determined via conduit 60. This may provide compensation for the torsional flexibility of the conduit 60 and maintain synchronous activation of both the top and bottom edges 24,26 of the aft portion 34. The conduit 60 may also be locked from a single location to prevent movement of the top or bottom edge actuators 56,58, thus assuring no uncommanded movement of the inner cowl 14.

The actuators 56,58 may be configured to translate the aft portion 34 of the inner cowl 14 from a first position to a second position. In the first position, the aft portion 34 may be a first vertical distance away from the aft end of the outer cowl 12, as illustrated in FIG. 7. In the second position, the aft portion 34 may be a second vertical distance away from the aft end of the outer cowl 12, as illustrated in FIG. 9. In various embodiments of the invention, the first vertical distance is greater than the second vertical distance. Thus, the translation of the aft portion 34 of the inner cowl 14 allows for varying an exit area for the fan duct. A vertical distance is defined herein as a distance measured from the aft end of the outer cowl 12 to the aft portion 34 of the inner cowl 14 along a vertical line that is perpendicular to the center axis of the nacelle 10, inner cowl 14, and/or engine 16.

The actuators 56,58 may translate the aft portion 34 of the inner cowl 14 to any plurality of positions between its minimum allowed translation (first position $P_1$ as depicted in FIG. 7) and its maximum allowed translation (second position $P_2$ as depicted in FIG. 9). For example, as illustrated in FIG. 8, the aft portion 34 of the inner cowl 14 may be translated aftward to an intermediate position $P_i$ between the first and second positions. Translating the aft portion 34 aftward increases the volume inward of the inner cowl 14 and decreases the volume of the air flow path or fan duct between the inner cowl 14 and the outer cowl 12, particularly decreasing the area at the fan duct's nozzle or exit.

Figure 11:
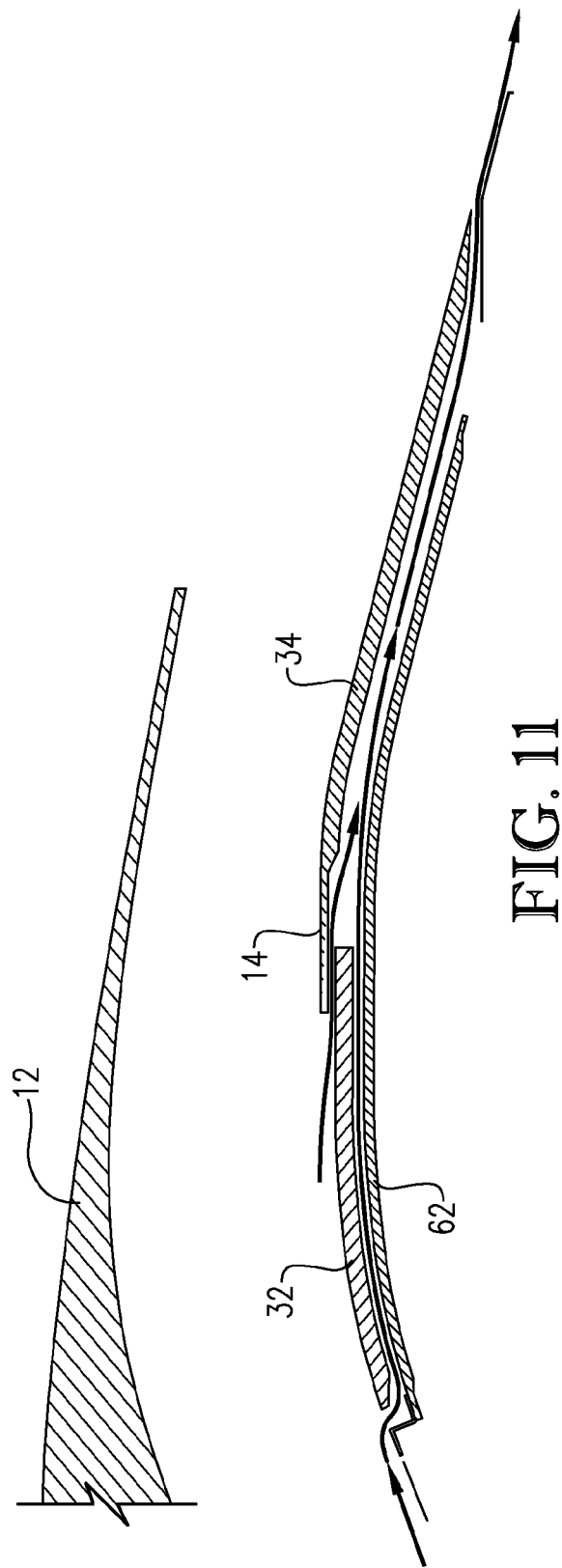
FIG. 11 is a fragmentary cross-sectional view of the nacelle of FIG. 1, further comprising the heat resistant panel of FIG. 10, wherein a gap between forward and aft portions of the inner cowl allows additional cool air to flow between the inner cowl and the heat resistant panel.
Figure 12:
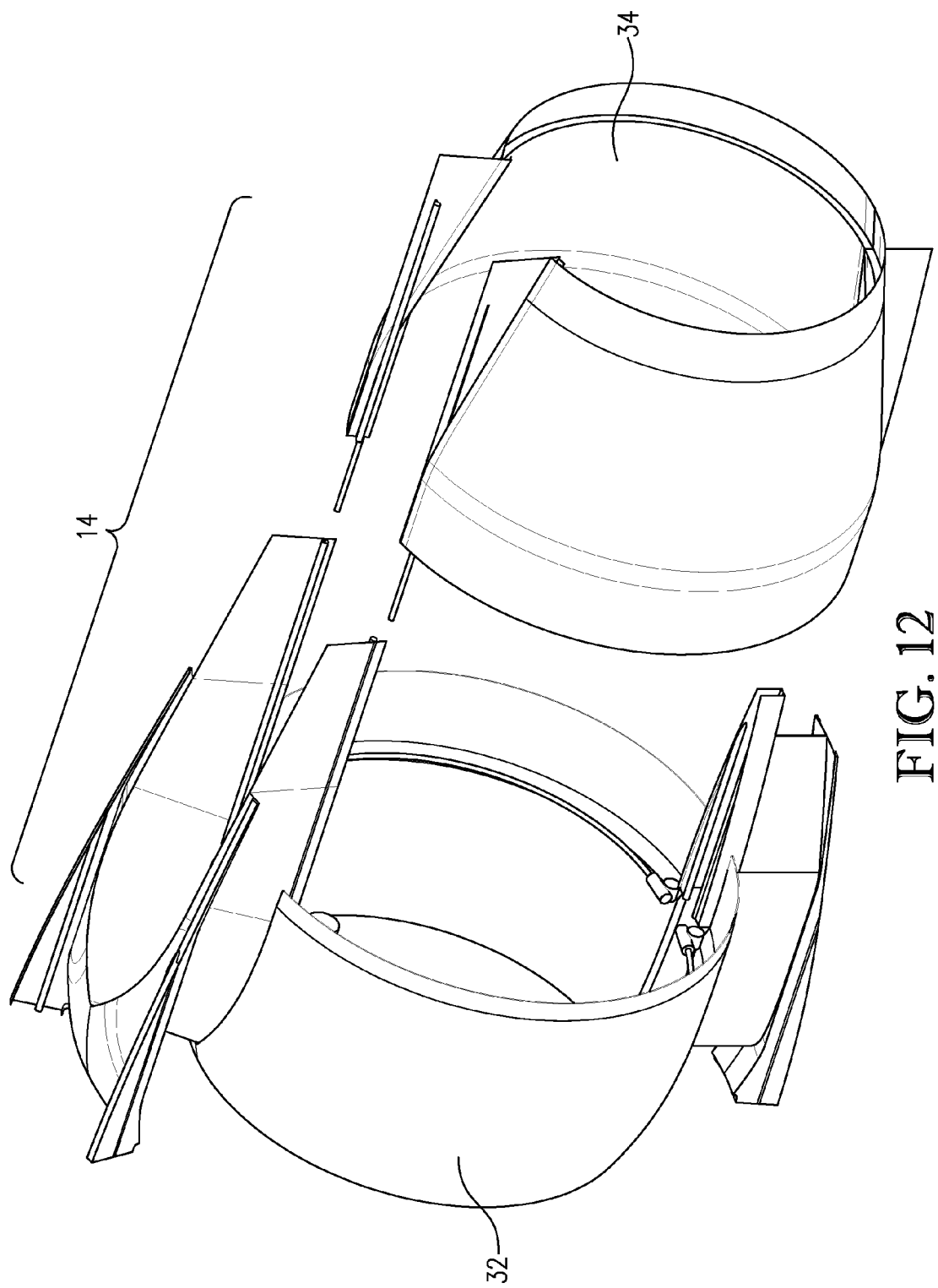
FIG. 12 is an exploded perspective view of the inner cowl of the nacelle of FIG. 1.

In some embodiments of the invention, the nacelle 10 may further comprise a heat-resistant panel 62 located inward of the inner cowl 14 and configured for shielding the forward and aft portions 32,34 from engine heat. Furthermore, a space between the heat-resistant panel 62 and the inner cowl 14 may allow cool air to move therebetween in a forward-to-aft direction. In an alternative embodiment, as illustrated in FIG. 11, a gap between the forward portion and the aft portion may allow additional cool air to flow therebetween and subsequently flow between the aft portion 34 and the heat-resistant panel 62. For example, the second front edge 46 of the aft portion 34 may overlap and be positioned outward of the first aft edge 44 of the forward portion 32, with a gap or space provided between the overlapped portions of the inner cowl 14.

The heat-resistant panel 62 may eliminate the need for conventional thermal insulation blankets. The heat-resistant panel 62 may be spaced apart from the inner cowl 14 using spacers and stand-offs (not shown) for attachment of the heat-resistant panel 62 to the forward portion 32. The heat-resistant panel 62 may also be attached to the upper and lower support structures 28,30.

The nacelle 10 of the present invention provides a number of advantages over the prior art. The aft translation of the aft portion 34 of the inner cowl 14 allows for a thin cross-section for the outer cowl 12. Dividing the inner cowl 14 into forward and aft portions 32,34 and moving only the aft portion 34 provides for a less-complicated translation system and reduces the weight of the part to be translated. Because only the inner cowl 14 is manipulated in embodiments of the present invention, the present configuration could be used in a nacelle with or without a thrust reverser in the outer cowl 12.

Another advantage of the present invention is the ability to use different materials in the forward and aft portions 32,34. For example, the aft portion 34 is located adjacent to engine combustors and turbine components and is exposed to higher temperatures than those located toward the front of the turbine core. Thus, the aft portion 34 may be made from high service temperature capable materials which tend to be more expensive, while the forward portion 32 may be made of different materials that do not handle as high of temperatures but may be less expensive. A single split line between the forward and aft portions 32,34 minimizes the length of potential leak paths, steps, and gaps within the fan duct.

Figure 15:
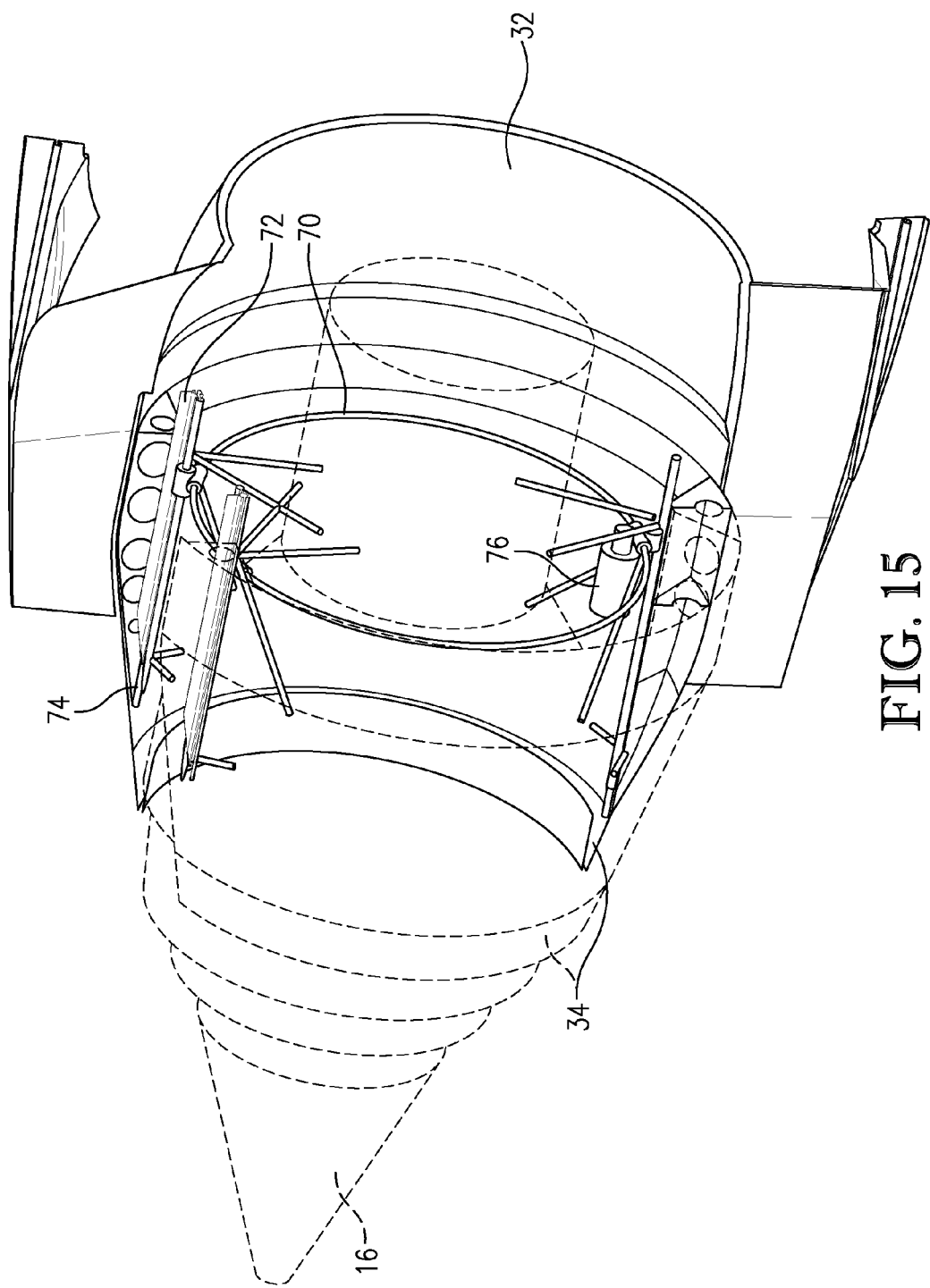
FIG. 15 is a perspective view of an alternative embodiment of the nacelle of FIG. 1 having a separate suspension system attachable to an engine core casing.

FIG. 15 illustrates an alternative embodiment of the invention illustrated in FIGS. 1-14. Specifically, FIG. 15 illustrates a separate suspension system 70 for sliding the aft portion 34 relative to the fixed forward portion 32. The suspension system 70 may have fixed components 72 configured to mount to a casing of an engine core, and translatable components 74 fixed to the aft portion 34 of the inner cowl 14. The translatable components 74 may be operable to translate the aft portion 34 toward and away from the forward portion 32 via an actuation system 76, such as actuators 56,58 described above.

Although the invention has been described with reference to the preferred embodiment illustrated in the attached drawing figures, it is noted that equivalents may be employed and substitutions made herein without departing from the scope of the invention as recited in the claims. For example, the concept described herein could be applied to any fluid flow apparatus where nozzle exit area variation is desired, such as with a primary exhaust nozzle exit area variation.

Having thus described various embodiments of the invention, what is claimed as new and desired to be protected by Letters Patent includes the following:

1. A nacelle inner cowl configured for placement between an outer cowl and an aircraft engine, the inner cowl comprising:
   a forward portion having a first front edge and a first aft edge;
   an aft portion having a second front edge and a second aft edge, wherein a largest radial distance between the inner cowl and a center axis of the inner cowl occurs at or forward of a location in which the forward portion and the aft portion meet or overlap;
   an actuator having a first element fixed relative to the forward portion and a second element configured to translate the aft portion in a forward-to-aft direction to decrease an exit area between the inner and outer cowl; and
   a first inner cowl half and a second inner cowl half, each comprising:
      a top edge extending from the forward portion's first front edge to the aft portion's second aft edge and configured to pivotally attach to opposing sides of a pylon, and
      a bottom edge extending from the forward portion's first front edge to the aft portion's second aft edge and configured to mechanically fasten and unfasten with each other.

2. The inner cowl of claim 1, wherein the actuator further comprises at least one top edge actuator located proximate the top edge, the first aft edge, and the second forward edge, and at least one bottom edge actuator located proximate the bottom edge, the first aft edge, and the second forward edge, wherein the top edge actuator and the bottom edge actuator each comprise the first element and the second element.

3. The inner cowl of claim 1, wherein part of the forward portion proximate the first aft edge transitions from a first thickness down to a second thickness smaller than the first thickness and a section having the second thickness overlaps a section of the aft portion proximate the second front edge.

4. The inner cowl of claim 1, wherein the forward portion is made of a different material than the aft portion.

5. The inner cowl of claim 1, further comprising a heat-resistant panel located inward of the forward and aft portions and configured for shielding the forward and aft portions from engine heat.

6. The inner cowl of claim 5, wherein the heat-resistant panel is spaced apart from the forward and aft portions.

7. The inner cowl of claim 1, wherein the forward portion is made of a different material than the aft portion.

8. An aircraft nacelle comprising:
   an outer cowl having a forward end, an aft end, an outer wall, and an inner wall;
   an inner cowl located inward of the outer cowl, forming an air flow path therebetween, wherein the inner cowl comprises:
      a forward portion made of a first type of material and having a first front edge, a first aft edge;
      an aft portion made of a second type of material and having a second front edge and a second aft edge, wherein at least part of the forward portion proximate the first aft edge or at least part of the aft portion proximate the second front edge substantially overlaps one of the forward portion and the aft portion; and
   an actuator having a first element fixed relative to the forward portion and a second element configured to translate the aft portion in a forward-to-aft direction.

9. The nacelle of claim 8, wherein the aft portion is translatable aftward from a first position to a second position, wherein an aft opening between the outer cowl and the inner cowl has a smaller exit area when the aft portion is in the second position than when the aft portion is in the first position.

10. The nacelle of claim 9, wherein a vertical distance between the aft end of the outer cowl and the aft portion of the inner cowl is smaller when the aft portion is in the second position than when the aft portion is in the first position, wherein the vertical distance is measured along a line perpendicular with a center axis of the nacelle.

11. The nacelle of claim 8, wherein a radial distance between the first front edge and a center axis of the nacelle is smaller than a radial distance between the first aft edge and the center axis; wherein a radial distance between the second front edge and the center axis of the nacelle is larger than a radial distance between the second aft edge and the center axis.

12. The nacelle of claim 8, wherein a largest radial distance between the inner cowl and a center axis of the nacelle occurs at or forward of a location in which the forward portion and the aft portion overlap.

13. The nacelle of claim 8, wherein the forward portion proximate the first aft end transitions from a first thickness down to a second thickness smaller than the first thickness such that a section having the second thickness overlaps a section of the aft portion proximate the second front edge.

14. The nacelle of claim 8, further comprising a heat-resistant panel located inward of the forward and aft portions and configured for shielding the forward and aft portions from engine heat.

15. The nacelle of claim 14, wherein the heat-resistant panel is spaced apart from the forward and aft portions such that air may flow between the heat-resistant panel and the forward and aft portions in a forward-to-aft direction.

16. The nacelle of claim 15, wherein the first aft edge overlaps and is spaced a distance apart from the aft portion of the inner cowl such that air may flow in a forward-to aft direction therebetween.

17. The nacelle of claim 8, wherein the first type of material is resistant to a first amount of heat, the second type of material is resistant to a second amount of heat, and the first amount of heat is less than the second amount of heat.

18. A nacelle inner cowl configured for placement between an outer cowl and an aircraft engine, the inner cowl comprising:
a forward portion having a first front edge and a first aft edge;
an aft portion having a second front edge and a second aft edge, wherein a largest radial distance between the inner cowl and a center axis of the inner cowl occurs at or forward of a location in which the forward portion and the aft portion meet or overlap;
an actuator having a first element fixed relative to the forward portion and a second element configured to translate the aft portion in a forward-to-aft direction to decrease an exit area between the inner and outer cowl; and
a heat-resistant panel located inward of the forward and aft portions and configured for shielding the forward and aft portions from engine heat.

19. The inner cowl of claim 18, wherein part of the forward portion proximate the first aft edge transitions from a first thickness down to a second thickness smaller than the first thickness and a section having the second thickness overlaps a section of the aft portion proximate the second front edge.

20. The inner cowl of claim 18, wherein the heat-resistant panel is spaced apart from the forward and aft portions.

\* \* \* \* \*